US012783296B2

(12) United States Patent
Udayashankar et al.

(10) Patent No.: US 12,783,296 B2
(45) Date of Patent: Nov. 3, 2026

(54) SYSTEMS AND METHODS FOR PERFORMING NETWORK ACCELERATED SCHEDULING

(71) Applicant: Acronis International GmbH, Schaffhausen (CH)

(72) Inventors: Sreeharsha Udayashankar, Waterloo (CA); Samer Al-Kiswany, Waterloo (CA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 442 days.

(21) Appl. No.: 18/481,483

(22) Filed: Oct. 5, 2023

(65) Prior Publication Data

US 2025/0117249 A1 Apr. 10, 2025

(51) Int. Cl.
*G06F 9/48* (2006.01)

(52) U.S. Cl.
CPC .................................. *G06F 9/4881* (2013.01)

(58) Field of Classification Search
CPC ..................................................... G06F 9/4881
See application file for complete search history.

(56) References Cited

U.S. PATENT DOCUMENTS

2006/0106749 A1* 5/2006 Ganfield ............. G06F 16/9024
2015/0215397 A1* 7/2015 Wong ...................... G06F 9/505
709/203
2017/0060641 A1* 3/2017 Ramaswamy ........ G06F 9/5038

OTHER PUBLICATIONS

Marios Kogias, George Prekas, Adrien Ghosn, Jonas Fietz, and Edouard Bugnion. 2019. R2P2: making RPCs first-class datacenter citizens. In Proceedings of the 2019 USENIX Conference on Usenix Annual Technical Conference (USENIX ATC '19). USENIX Association, USA, 863-879. (Year: 2019).*
Kay Ousterhout, Patrick Wendell, Matei Zaharia, and Ion Stoica. 2013. Sparrow: distributed, low latency scheduling. In Proceedings of the Twenty-Fourth ACM Symposium on Operating Systems Principles (SOSP '13). Association for Computing Machinery, New York, NY, USA, 69-84. (Year: 2013).*
This paper focuses on fine-grained task scheduling for low-latency applications. (Year: 2013).*
Kogias et al., "R2P2: Making RPCs first-class datacenter citizens," Proceedings of the 2019 USENIX Annual Technical Conference (ATC 19), Jul. 10-12, 2019, pp. 863-879.

(Continued)

*Primary Examiner* — Ramon A. Mercado
(74) *Attorney, Agent, or Firm* — ArentFox Schiff LLP; Michael Fainberg

(57) ABSTRACT

Disclosed herein are systems and method for performing network accelerated scheduling. In one aspect, a method may receive, at a programmable switch comprising a scheduler, a job comprising a plurality of tasks from a client. The method may store, on the programmable switch, the plurality of tasks in a queue. The method may receive an indication from a first executor on a working node that the first executor is available for task execution. The method may schedule, using a scheduling policy, at least one task in the queue to be performed by the first executor. The method may transmit the at least one task to the first executor. The method may receive a task completion indication from the first executor.

20 Claims, 6 Drawing Sheets

(56) References Cited

OTHER PUBLICATIONS

Ousterhout et al., "Sparrow: Distributed, Low Latency Scheduling, Proceedings of the Twenty-Fourth ACM Symposium on Operating Systems Principles," Nov. 3-6, 2013, pp. 69-84.
Zhu et al., "RackSched: A Microsecond-Scale Scheduler for Rack-Scale Computers," Proceedings of the 14th USENIX Symposium on Operating Systems Design and Implementation, Nov. 4-6, 2020, pp. 1225-1240.

* cited by examiner

SYSTEMS AND METHODS FOR PERFORMING NETWORK ACCELERATED SCHEDULING

FIELD OF TECHNOLOGY

The present disclosure relates to the field of data networks, and, more specifically, to systems and methods for performing network accelerated scheduling.

BACKGROUND

Conventional software-based schedulers fall under one of two paradigms: centralized and distributed.

Centralized schedulers rely on a single scheduler to handle scheduling operations for an entire cluster. While this results in precise scheduling decisions, centralized schedulers cannot handle large clusters with micro-scale workloads because the scheduler becomes a performance bottleneck and cannot scale.

Distributed schedulers attempt to address this by using multiple autonomous schedulers to operate on the cluster. However, due to minimal communication between these schedulers, they result in suboptimal scheduling decisions, increasing tail latencies.

Certain network-accelerated schedulers have tried to address these problems by using programmable switches for scheduling. However, such schedulers maintain worker side queues because they cannot host queues on the switches, and forward tasks to workers using variants of a join-shortest-queue policy. This results in inefficiencies while attempting to find free workers. It also requires a large amount of onboard switch resources such as pipeline stages, being unable to support large clusters as a result.

SUMMARY

In one exemplary aspect, the techniques described herein relate to a method for performing network accelerated scheduling, the method including: receiving, at a programmable switch including a scheduler, a job including a plurality of tasks from a client; storing, on the programmable switch, the plurality of tasks in a queue; receiving an indication from a first executor on a working node that the first executor is available for task execution; scheduling, using a scheduling policy, at least one task in the queue to be performed by the first executor; transmitting the at least one task to the first executor; and receiving a task completion indication from the first executor.

In some aspects, the techniques described herein relate to a method, further including: receiving an indication from a second executor on the working node that the second executor is available for task execution; scheduling, using the scheduling policy, at least one subsequent task in the queue to be performed by the second executor; transmitting the at least one subsequent task to the second executor; and receiving another task completion indication from the second executor.

In some aspects, the techniques described herein relate to a method, wherein the first executor and the second executor perform task execution in parallel.

In some aspects, the techniques described herein relate to a method, wherein receiving the job includes receiving at least one job submission packet that indicates each of the plurality of tasks and task data dependencies.

In some aspects, the techniques described herein relate to a method, wherein the queue has a P4-compatible circular queue design.

In some aspects, the techniques described herein relate to a method, wherein the P4-compatible circular queue design utilizes atomic operations with delayed pointer fixing to work around a restrictive memory model of the programmable switch.

In some aspects, the techniques described herein relate to a method, wherein the scheduling policy is a first-in-first-out (FIFO) policy, and wherein scheduling the at least one task in the queue to be performed by the first executor includes: identifying the at least one task for scheduling on the first executor in response to determining that the at least one task is an oldest available task in the queue.

In some aspects, the techniques described herein relate to a method, wherein the scheduling policy is a priority-aware policy, further including: assigning a priority value to each of the plurality of tasks; and wherein scheduling the at least one task in the queue to be performed by the first executor includes identifying the at least one task for scheduling on the first executor in response to determining that the at least one task is an oldest available task with a highest priority value in the queue.

In some aspects, the techniques described herein relate to a method, wherein the scheduling policy is a resource-constraint aware policy, further including: determining minimum resources necessary to execute each respective task of the plurality of tasks; and wherein scheduling the at least one task in the queue to be performed by the first executor includes identifying the at least one task for scheduling on the first executor in response to determining that the first executor has the minimum resources necessary to execute the at least one task.

In some aspects, the techniques described herein relate to a method, wherein the scheduling policy is a data-locality aware policy, further including: determining, in nodes within a cluster including the working node, each location of data required to execute each respective task of the plurality of tasks; and wherein scheduling the at least one task in the queue to be performed by the first executor includes identifying the at least one task for scheduling on the first executor in response to determining that a location of data required to execute the at least one task is stored on the working node of the first executor.

In some aspects, the techniques described herein relate to a method, wherein the client is a remote procedure call (RPC) client.

It should be noted that the methods described above may be implemented in a system comprising a hardware processor. Alternatively, the methods may be implemented using computer executable instructions of a non-transitory computer readable medium.

In some aspects, the techniques described herein relate to a system for performing network accelerated scheduling, including: at least one memory; at least one hardware processor coupled with the at least one memory and configured, individually or in combination, to: receive, at a programmable switch including a scheduler, a job including a plurality of tasks from a client; store, on the programmable switch, the plurality of tasks in a queue; receive an indication from a first executor on a working node that the first executor is available for task execution; schedule, using a scheduling policy, at least one task in the queue to be performed by the first executor; transmit the at least one task to the first executor; and receive a task completion indication from the first executor.

In some aspects, the techniques described herein relate to a non-transitory computer readable medium storing thereon computer executable instructions for performing network accelerated scheduling, including instructions for: receiving, at a programmable switch including a scheduler, a job including a plurality of tasks from a client; storing, on the programmable switch, the plurality of tasks in a queue; receiving an indication from a first executor on a working node that the first executor is available for task execution; scheduling, using a scheduling policy, at least one task in the queue to be performed by the first executor; transmitting the at least one task to the first executor; and receiving a task completion indication from the first executor.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
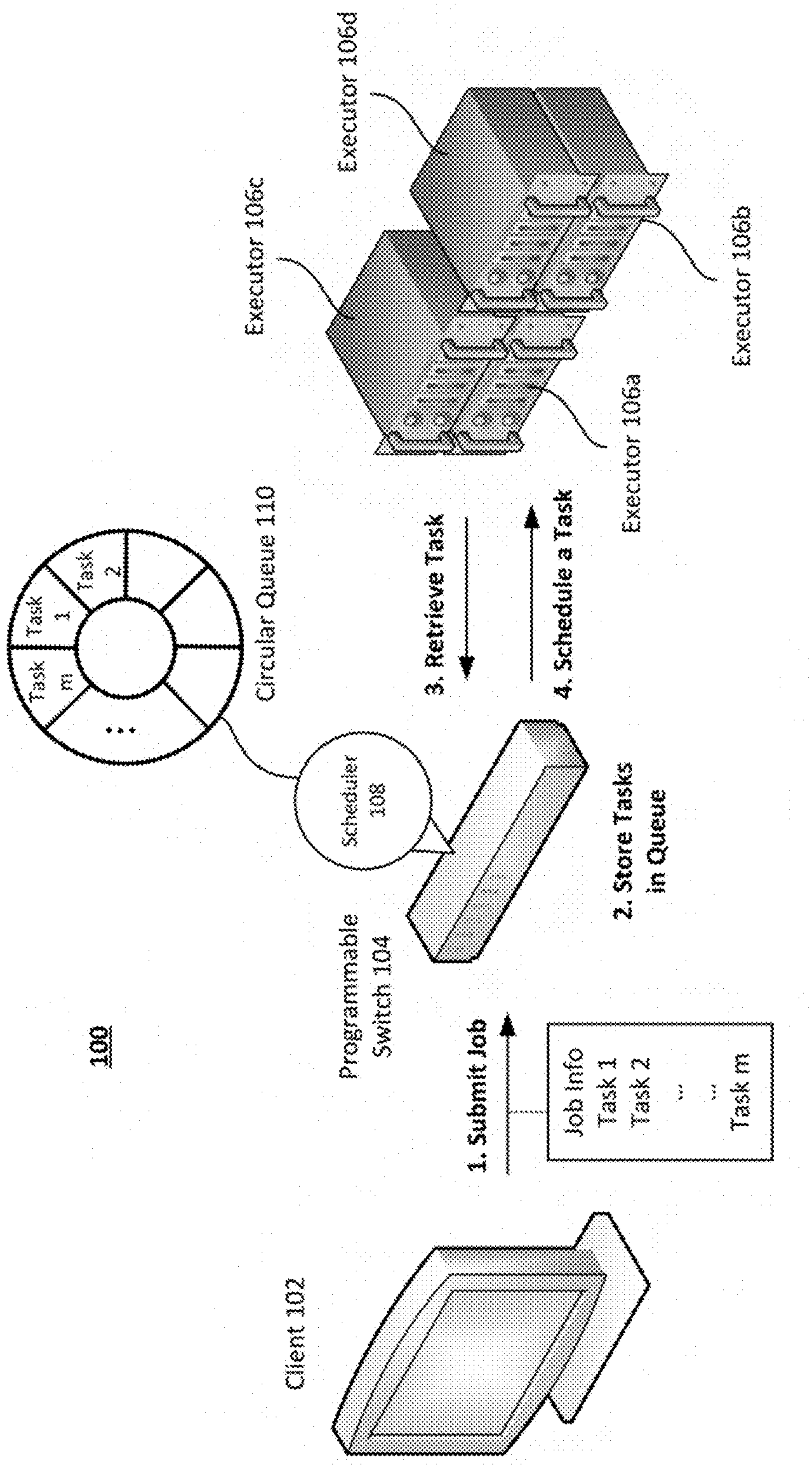
FIG. 1 is a block diagram illustrating a system for performing network accelerated scheduling.

Exemplary aspects are described herein in the context of a system, method, and computer program product for performing network accelerated scheduling. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Micro-scale workloads have strict scheduling latency and throughput requirements as seen in real-time analytics, algorithmic smart trading, financial analytics, and low-latency web services. Conventional software-based schedulers fail to meet the requirements due to various limitations. On a high-level the present disclosure describes utilizing programmable switches to accelerate scheduling decisions and meet the requirements. Using the systems and methods of the present disclosure, it is possible to make millions of precise scheduling decisions with a centralized scheduler hosted on a switch, enabling the scheduler to support micro-scale workloads on large clusters. Simply put, systems developed in the past could not host a queue on a switch. They relied on approximating a centralized queue via join-shortest-queue policies on the switch and executor side queues.

In an exemplary aspect, a scheduler of the present disclosure is hosted on a programmable switch. A novel P4-compatible circular queue design is used to queue tasks on the switch until an executor is available to run them. Executors pull tasks from the switch when they are free, resulting in tasks being precisely sent to the next available executor.

The P4-compatible queue utilizes atomic operations with delayed pointer fixing to work around the restrictive memory model of programmable switches. In addition to simple first-in-first-out (FIFO) scheduling, the scheduler supports complex policies falling into two categories: class-of-service-based and constraint-based scheduling. This capability is demonstrated by designing task priority-aware, data locality-aware, and resource constraint-aware scheduling policies and evaluating them. Examples of policies include, but are not limited to: a priority-aware policy where certain tasks are supposed to receive higher priority than others (such as a policy with four different priority levels for tasks), a resource-constraint aware policy in which tasks require certain resources, like GPUs or accelerators, to run, and the scheduler needs to be aware of this when scheduling these tasks, and a data-locality aware policy that may have the data required to run the policy residing on certain nodes within the cluster, and where the scheduler must attempt to schedule these tasks on these nodes to reduce network transfers and improve task run times.

FIG. 1 is a block diagram illustrating system 100 for performing network accelerated scheduling. System 100 includes client 102, programmable switch 104 on which scheduler 108 is installed, and executors 106. In some aspects, client 102 may be a framework such as Spark, which includes dependency-tracking modules and submits batches of independent tasks to scheduler 108, or may be a remote procedure call (RPC) client which submits single or micro-batches of independent RPC calls to scheduler 108. Client 102 is configured to track data dependencies (if any) within jobs and submit batches of tasks by creating job_submission packets.

More specifically, client 102 submits micro-batches of tasks to scheduler 108 using job_submission packets. Switch 104 queues these tasks on a P4-compatible circular queue until a suitable executor 106 (e.g., executor **106*a*, executor 106*b*, executor 106*c*, etc.) is found to run the tasks. Executors 106 pull tasks from switch 104 when they are free using special task_retrieval packets. Scheduler 108 assigns the next available task to a given executor 106*a*/106*b*/106*c*/106*d* per the scheduling policy. In some aspects, scheduler 108** also assigns tasks to executors using other scheduling policies. For example, the scheduling policy may be a first-in-first-out (FIFO) policy where the task at the head of the queue is the oldest available task assigned. In another example, the scheduling policy may be a priority-aware policy where the oldest task from the highest priority level is assigned before other tasks.

In some aspects, executors 106 are processes running on worker nodes which receive tasks from scheduler 108 and run them. Typically, a worker node runs an executor (e.g., 106*a*) on each available logical core. For example, if a worker node has multiple cores, it may run multiple executors. It should be noted that executors do not have queues in accordance with the present disclosure. This is because executor queues cause localized head-of-line blocking at each executor. If there are three tasks queued on an executor, the third would need to wait for the first and second to finish before it can be run—even if all other executors in the cluster are idle. In the present disclosure, the queue is centralized (e.g., the tasks are run on the next available executor as soon as it is free). Executors each run one task and contact the scheduler again to request a new task upon completion.

Existing approaches have mainly used software-based scheduling techniques, which are ineffective for micro-scale workloads. Approaches using programmable switches have also failed to implement switch-based queues and instead use executor/worker-side queues, leading to numerous inefficiencies. These systems also primarily focus on FIFO scheduling and do not support complex scheduling policies.

Figure 2:
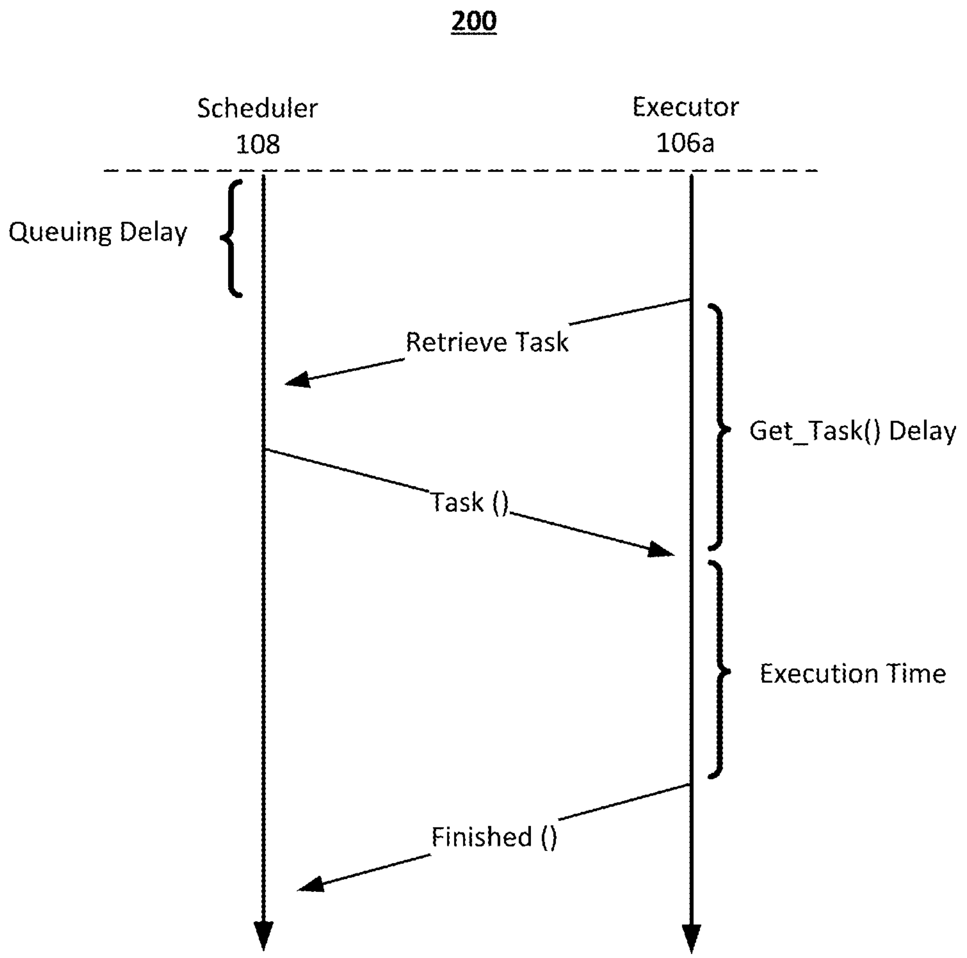
FIG. 2 is a flow diagram illustrating task delivery and execution.

FIG. 2 is a flow diagram 200 illustrating task delivery and execution. Scheduler 108 may first receive a plurality of tasks from client 102 and begin populating the queue. This populating is represented by the queuing delay in FIG. 2. When an executor such as executor 106*a* is available (i.e., is not currently executing a different task), the executor may retrieve a task from the queue by requesting one from scheduler 108. Scheduler 108 then schedules a task for the executor to perform. In some aspects, scheduler 108 may internally store a record of the task being scheduled, the executor being assigned, and timestamps of the task request and task schedule. This request and retrieval stage is part of the Get_Task( ) Delay in FIG. 2.

The executor then performs the task and sends a task completion indication. This is represented by execution time and finished ( ) in FIG. 2. In some aspects, subsequent to transmitting a task to an executor, scheduler 108 may determine, after a period of time as elapsed and no task completion indication is received, whether the executor is actively performing the task. For example, scheduler 108 may transmit an availability request. If executor indicates that the executor is not available, it is understood that the executor is still running the task.

Figure 3:
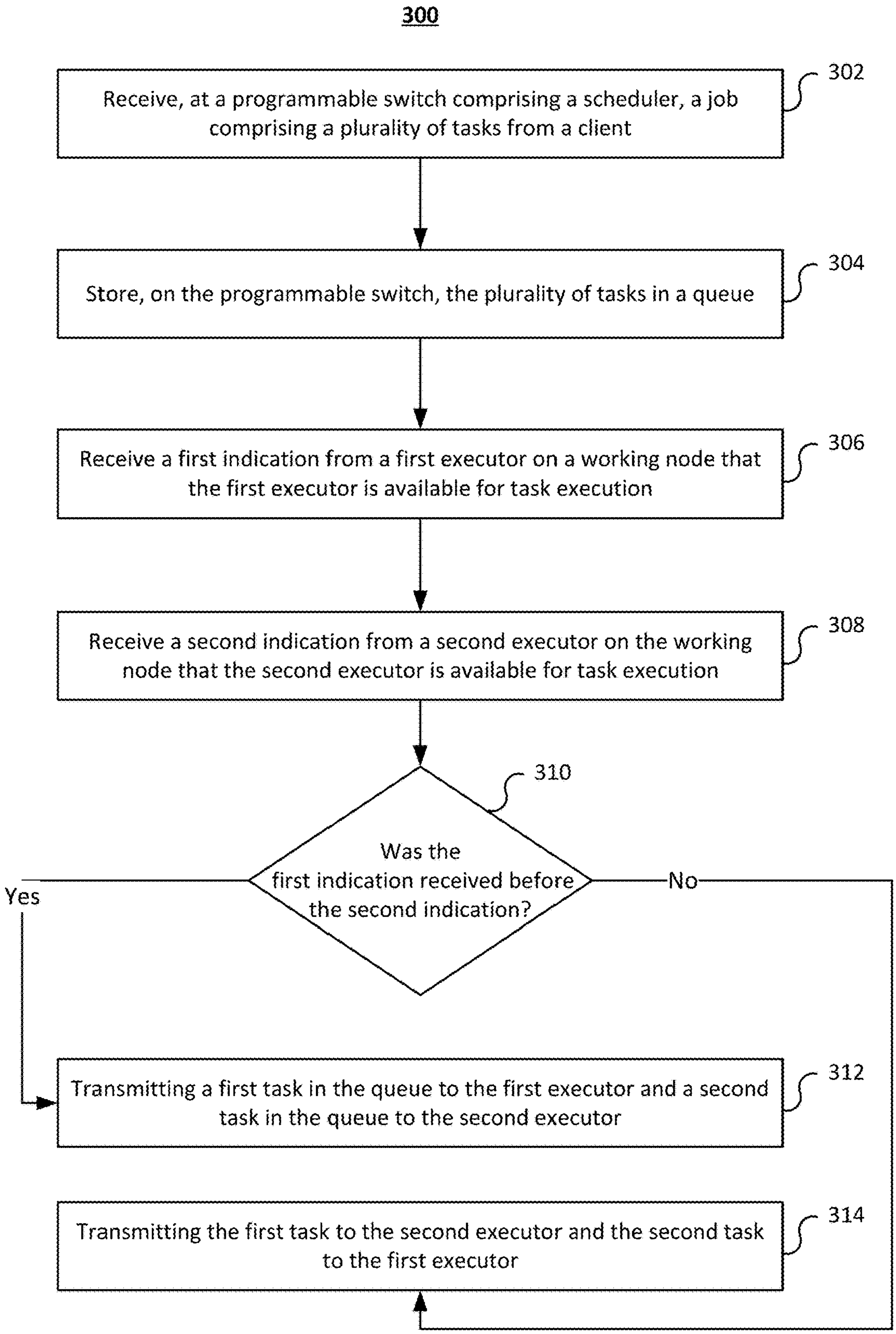
FIG. 3 illustrates a flow diagram of a method for performing network accelerated scheduling.

FIG. 3 illustrates a flow diagram of method 300 for performing network accelerated scheduling. At 302, scheduler 108 on programmable switch 104 receives a job comprising a plurality of tasks (e.g., tasks 1, 2, . . . m) from a client 102. In some aspects, the client is a remote procedure call (RPC) client. In some aspects, receiving the job comprises receiving at least one job submission packet that indicates each of the plurality of tasks and task data dependencies. For example, the at least one job submission packet may indicate when the minimum resources required to run each task (e.g., a GPU, a minimum memory amount, etc.), a priority level of each task, and data dependencies (e.g., data needed to execute the task).

At 304, scheduler 108 stores the plurality of tasks in a queue. In some aspects, the queue has a P4-compatible circular queue design as shown in circular queue 110. The P4-compatible circular queue design utilizes atomic operations with delayed pointer fixing to work around a restrictive memory model of the programmable switch 104.

At 306, scheduler 108 receives a first indication from a first executor (e.g., executor 106*a*) on a working node that the first executor is available for task execution.

At 308, scheduler 108 receives a second indication from a second executor (e.g., executor 106*b*) on a working node that the second executor is available for task execution. In some aspects, both executors are on different nodes. In some aspects, the different nodes are part of a same cluster of nodes.

At 310, scheduler 108 determines whether the first indication was received before the second indication. If so, at 312, scheduler 108 schedules and transmits, using a scheduling policy, a first task in the queue to be performed by the first executor and a second task (i.e., a subsequent task) in the queue to be performed by the second executor. Otherwise, at 314, scheduler 108 schedules and transmits, using the scheduling policy, the first task in the queue to be performed by the second executor and the second task (i.e., a subsequent task) in the queue to be performed by the first executor.

In some aspects, subsequent to the first task and second task being completed, scheduler 108 receives task completion indications from the first executor and the second executor.

In some aspects, multiple tasks may be assigned to each of the executors over time based on their individual availability. For example, a third task may be assigned to one of the executors in response to receiving a message indicating availability. It should be noted that the first executor and the second executor perform task execution in parallel. This improves efficiency of the entire system (e.g., system 100).

In some aspects, the scheduling policy is a first-in-first-out (FIFO) policy. Accordingly, identifying the task for scheduling on the first executor is in response to determining that the task is an oldest available task in the queue.

In some aspects, the scheduling policy is a priority-aware policy. Accordingly, scheduler 108 assigns a priority value to each of the plurality of tasks. For example, the first task may have a first priority level and the second task may have a different priority level. These priority levels may be stored in a data structure that maps the priority values, data dependencies, and required resources to each respective task. In terms of priority, scheduler 108 schedules a task on the first executor in response to determining that the task is an oldest available task with a highest priority value in the queue.

Figure 4:
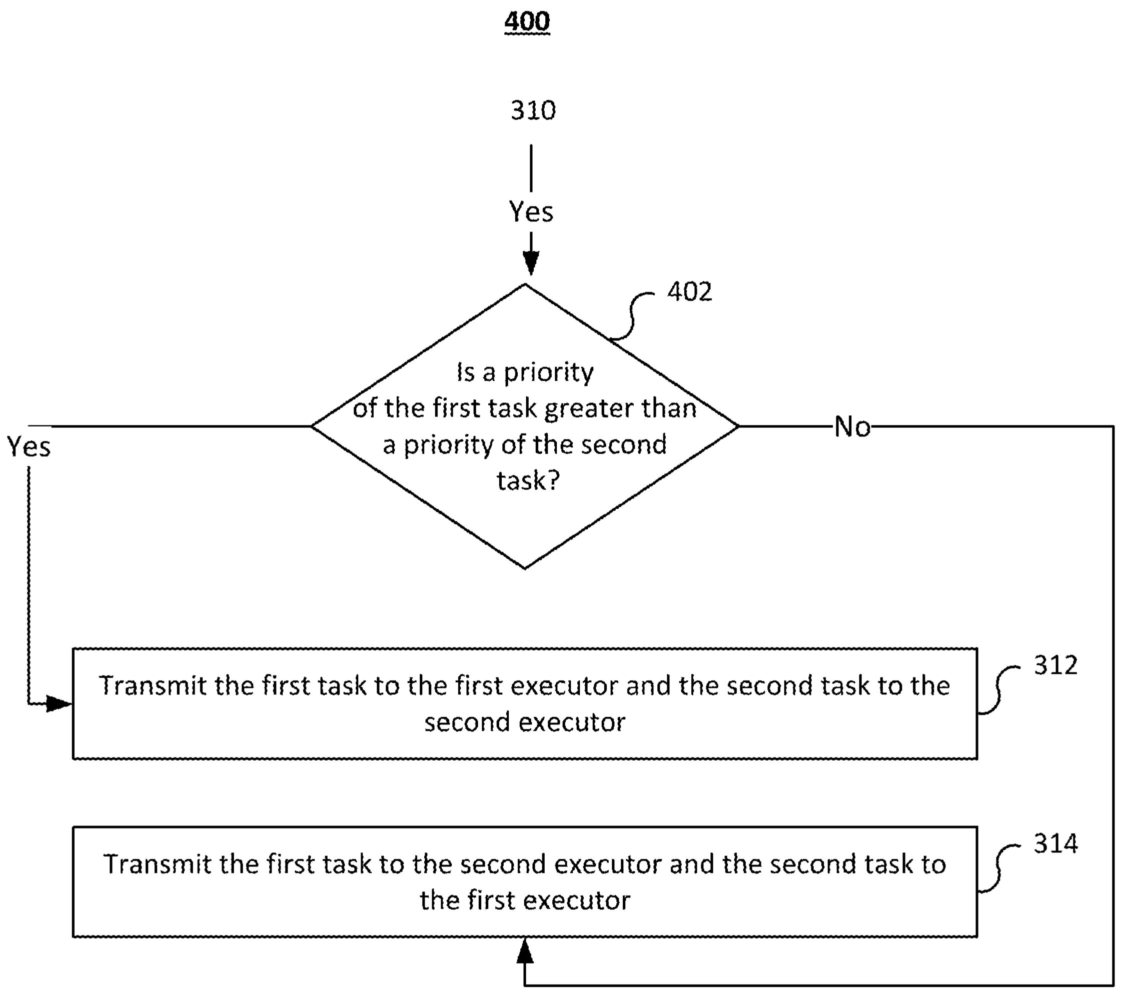
FIG. 4 illustrates a flow diagram of a method for performing network accelerated scheduling based on a priority-aware scheduling policy.

FIG. 4 illustrates a flow diagram of a method 400 for performing network accelerated scheduling based on a priority-aware scheduling policy. Method 400 may begin after step 310 of FIG. 3 (where the determination is "yes"). At 402, scheduler 108 determines whether a priority of the first task is greater than a priority of the second task. If the priority of the first task is greater, method 400 advances to 312 (i.e., the task is assigned to the executor that indicated priority first). Otherwise, method 400 advances to 314.

In some aspects, scheduler 108 may further determine whether the first executor will complete a respective task faster than the second executor and assign the higher priority task to the executor with the faster expected completion time. For example, the expected completion time may be a function of a processing requirement of the task and a bandwidth of the executor (e.g., available memory, CPU utilization, etc.).

In some aspects, the scheduling policy is a data-locality aware policy. Accordingly, scheduler 108 may determine, in nodes within a cluster comprising the working node, each location of data required to execute each respective task of the plurality of tasks. Scheduler 108 may then identify the at least one task for scheduling on the first executor in response to determining that a location of data required to execute the at least one task is stored on the working node of the first executor.

Figure 5:
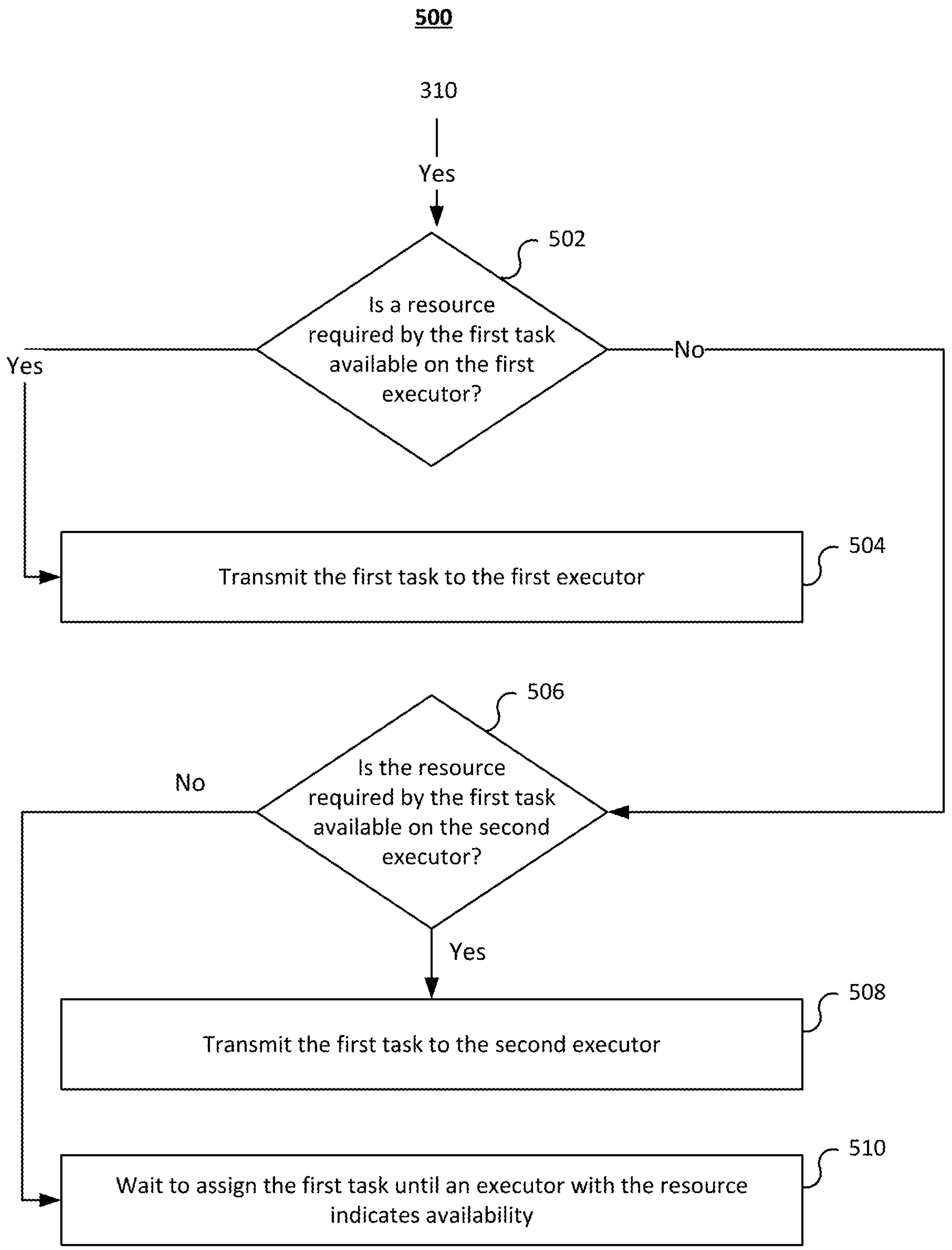
FIG. 5 illustrates a flow diagram of a method for performing network accelerated scheduling based on a constraint-aware scheduling policy.

FIG. 5 illustrates a flow diagram of a method 500 for performing network accelerated scheduling based on a resource-constraint aware scheduling policy. In some aspects, scheduler 108 may determine minimum resources necessary to execute each respective task of the plurality of tasks, and may identify a task for scheduling on an available executor in response to determining that the available executor has the minimum resources necessary to execute the task.

At 502, scheduler 108 determines whether a resource (e.g., a GPU) required to execute the first task is available on the first executor. If the resource is available, method 500 advances to 504, where scheduler 108 transmits the first task to the first executor. Otherwise, method 500 advances to 506, where scheduler 108 determines whether the resource required by the first task is available on the second executor. If available, at 508, scheduler 108 transmits the first task to the second executor. If unavailable, method 510 proceeds to 510, where scheduler 108 waits to assign the first task until an executor with the resource indicates its available to execute a task.

At least one benefit of the systems and methods of the present disclosure is derived from hosting the circular queue on the switch by making it P4 compatible. Typically, circular queues utilize two pointers: an add pointer to push tasks into the queue and a retrieve pointer to remove tasks from the queue. When implementing these queues in a software, first the pointers are read and then their values are checked to ensure that the queue is not empty/full. After this, the pointers are modified to perform the required operation (add or retrieve).

However, on programmable switches, a single pointer can only be accessed once per packet, due to the restrictive memory model of the switches. This makes an implementation similar to software-based queues impossible, as one cannot first check the pointers value and then modify it.

Thus, in the present disclosure, atomic operations are utilized to read and modify the pointers in one access. This may lead to incorrect modification in some scenarios (when the queue is full or empty), requiring pointer fixing by packet recirculation. Packet recirculation involves scheduler 108 resending a processed packet back to the entry port of the switch on a fast loopback path. This causes it to appear as a fresh packet, allowing scheduler 108 to modify the same pointers once again.

The novelty in the design comes from hosting a centralized global queue on the switch using the combination of these atomic operations and pointer fixing, leading to better performance over conventional approaches that host distributed software-based queues on executor nodes.

Figure 6:
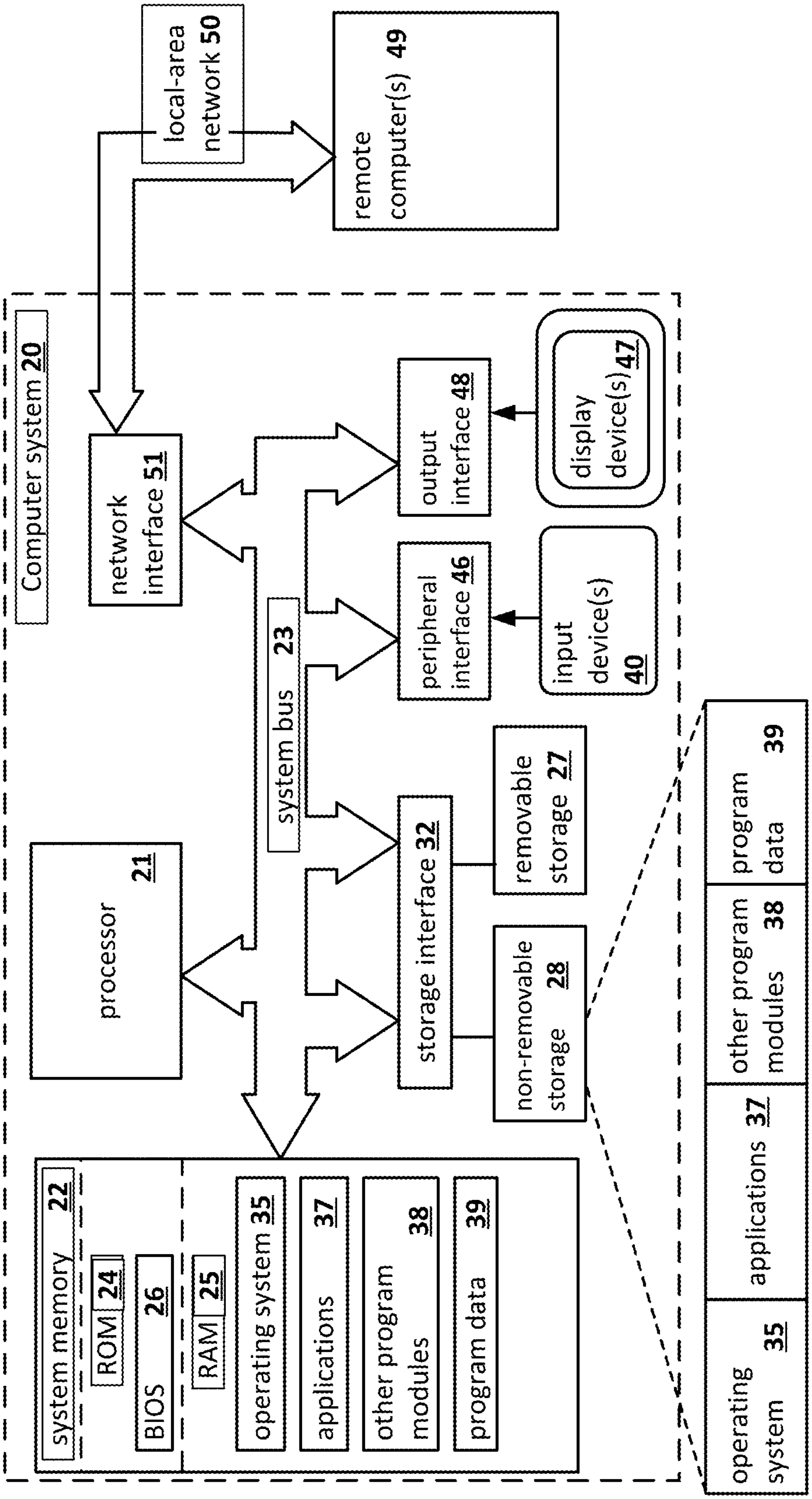
FIG. 6 presents an example of a general-purpose computer system on which aspects of the present disclosure can be implemented.

FIG. 6 is a block diagram illustrating a computer system 20 on which aspects of systems and methods for performing network accelerated scheduling may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing network accelerated scheduling, the method comprising:

receiving, at a programmable switch comprising a scheduler, a job comprising a plurality of tasks from a client;

storing, on the programmable switch, the plurality of tasks in a circular queue;

receiving a task retrieval packet, at the programmable switch, from a first executor on a working node that the first executor is free;

scheduling, using a scheduling policy, at least one task in the circular queue to be performed by the first executor;

transmitting the at least one task from the programmable switch to the first executor in response to receiving the task retrieval packet; and receiving a task completion indication from the first executor.

2. The method of claim 1, further comprising:

receiving an indication from a second executor on the working node that the second executor is available for task execution;

scheduling, using the scheduling policy, at least one subsequent task in the queue to be performed by the second executor;

transmitting the at least one subsequent task to the second executor; and receiving another task completion indication from the second executor.

3. The method of claim 2, wherein the first executor and the second executor perform task execution in parallel.

4. The method of claim 1, wherein receiving the job comprises receiving at least one job submission packet that indicates each of the plurality of tasks and task data dependencies.

5. The method of claim 1, wherein the queue has a P4-compatible circular queue design.

6. The method of claim 5, wherein the P4-compatible circular queue design utilizes atomic operations with delayed pointer fixing to work around a restrictive memory model of the programmable switch.

7. The method of claim 1, wherein the scheduling policy is a first-in-first-out (FIFO) policy, and wherein scheduling the at least one task in the queue to be performed by the first executor comprises:

identifying the at least one task for scheduling on the first executor in response to determining that the at least one task is an oldest available task in the queue.

8. The method of claim 1, wherein the scheduling policy is a priority-aware policy, further comprising:

assigning a priority value to each of the plurality of tasks; and wherein scheduling the at least one task in the queue to be performed by the first executor comprises identifying the at least one task for scheduling on the first executor in response to determining that the at least one task is an oldest available task with a highest priority value in the queue.

9. The method of claim 1, wherein the scheduling policy is a resource-constraint aware policy, further comprising:

determining minimum resources necessary to execute each respective task of the plurality of tasks; and wherein scheduling the at least one task in the queue to be performed by the first executor comprises identifying the at least one task for scheduling on the first executor in response to determining that the first executor has the minimum resources necessary to execute the at least one task.

10. The method of claim 1, wherein the scheduling policy is a data-locality aware policy, further comprising:

determining, in nodes within a cluster comprising the working node, each location of data required to execute each respective task of the plurality of tasks; and wherein scheduling the at least one task in the queue to be performed by the first executor comprises identifying the at least one task for scheduling on the first executor in response to determining that a location of data required to execute the at least one task is stored on the working node of the first executor.

11. The method of claim 1, wherein the client is a remote procedure call (RPC) client.

12. A system for performing network accelerated scheduling, comprising:

at least one memory;

at least one hardware processor coupled with the at least one memory and configured, individually or in combination, to:

receive, at a programmable switch comprising a scheduler, a job comprising a plurality of tasks from a client;

store, on the programmable switch, the plurality of tasks in a circular queue;

receive a task retrieval packet, at the programmable switch, from a first executor on a working node that the first executor is free;

schedule, using a scheduling policy, at least one task in the circular queue to be performed by the first executor;

transmit the at least one task from the programmable switch to the first executor in response to receiving the task retrieval packet; and receive a task completion indication from the first executor.

13. The system of claim 12, wherein the at least one hardware processor is further configured to:

receive an indication from a second executor on the working node that the second executor is available for task execution;

schedule, using the scheduling policy, at least one subsequent task in the queue to be performed by the second executor;

transmit the at least one subsequent task to the second executor; and receive another task completion indication from the second executor.

14. The system of claim 13, wherein the first executor and the second executor perform task execution in parallel.

15. The system of claim 12, wherein receiving the job comprises receiving at least one job submission packet that indicates each of the plurality of tasks and task data dependencies.

16. The system of claim 12, wherein the queue has a P4-compatible circular queue design.

17. The system of claim 16, wherein the P4-compatible circular queue design utilizes atomic operations with delayed pointer fixing to work around a restrictive memory model of the programmable switch.

18. The system of claim 12, wherein the scheduling policy is a first-in-first-out (FIFO) policy, and wherein the at least one hardware processor is further configured to schedule the at least one task in the queue to be performed by the first executor by:

identifying the at least one task for scheduling on the first executor in response to determining that the at least one task is an oldest available task in the queue.

19. The system of claim 12, wherein the scheduling policy is a priority-aware policy, wherein the at least one hardware processor is further configured to:

assign a priority value to each of the plurality of tasks; and wherein scheduling the at least one task in the queue to be performed by the first executor comprises identifying the at least one task for scheduling on the first executor in response to determining that the at least one task is an oldest available task with a highest priority value in the queue.

20. A non-transitory computer readable medium storing thereon computer executable instructions for performing network accelerated scheduling, including instructions for:

receiving, at a programmable switch comprising a scheduler, a job comprising a plurality of tasks from a client;

storing, on the programmable switch, the plurality of tasks in a circular queue;

receiving a task retrieval packet, at the programmable switch, from a first executor on a working node that the first executor is free;

scheduling, using a scheduling policy, at least one task in the circular queue to be performed by the first executor;

transmitting the at least one task from the programmable switch to the first executor in response to receiving the task retrieval packet; and receiving a task completion indication from the first executor.

* * * * *